June 29, 1965   G. C. CHAPMAN   3,192,028
APPARATUS FOR FORMING GLASS
Filed Feb. 13, 1963   2 Sheets-Sheet 1

INVENTOR.
GEORGE C. CHAPMAN
BY
ATTORNEYS

INVENTOR.
GEORGE C. CHAPMAN
BY
ATTORNEYS

United States Patent Office 3,192,028
Patented June 29, 1965

3,192,028
APPARATUS FOR FORMING GLASS
George C. Chapman, Toledo, Ohio, assignor to Owens-Illinois Glass Company, a corporation of Ohio
Filed Feb. 13, 1963, Ser. No. 258,258
4 Claims. (Cl. 65—199)

This invention relates to an apparatus for producing precision sheets, rods or bars of glass. More particularly, this invention relates to apparatus for drawing glass through a cabon die of considerable length utilizing atmospheric pressure to keep the die filled while drawing to produce sheets, rods or bars of glass having exact, predetermined dimensions.

It has been the practice in the past to draw molten glass through a die or "lenser" by utilizing a "bait" which is lowered until it contacts the molten glass issuing from the "lenser" and then raising the "bait" after the molten glass has stuck thereto. When following this procedure, the thickness of the sheet of glass drawn or the rod or bar being drawn, depends to a great extent upon the rate at which the "bait" is moved upwardly and on the temperature and viscosity of the molten glass as it passes out of the "lenser." Furthermore, the glass, as it is being drawn, is still somewhat molten and is not cooled to a rigid state until the glass is considerably above the "lenser." When attempting to draw glasses having a composition such that they are subject to devitrification, it is extremely difficult to maintain the temperature of the glass above the liquidus and still be able to draw the glass with any precision.

With the foregoing in mind, it is an object of this invention to provide apparatus for drawing glass through a carbon die such that the glass is at the liquidus temperature upon entry into the die and at substantially its solidus temperature as it is drawn from the die.

It is an additional object of this invention to provide apparatus for forming sheets of glass by utilizing a carbon die of substantial length partially submerged in the molten glass and in which the glass is maintained within and substantially fills the die, by atmospheric pressure.

Other and further objects will be apparent from the following description taken in conjunction with the annexed sheets of drawings wherein.

Figure 2:
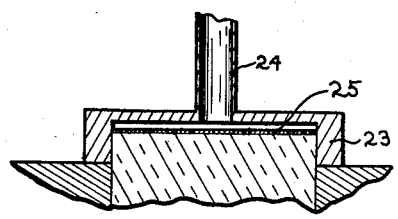
FIG. 2 is a partial cross-sectional view taken at line 2—2 of FIG. 1.

It has been applicant's experience that in attempting to form sheets, rods or bars of glass by the normal or usual drawing technique, that it is impossible to form such glass articles with exact precision as to thickness or dimensions. This problem is particularly acute when attempting to form glass articles from devitrifiable glass having a relatively high liquidus temperature. In order to prevent substantial devitrification it is necessary that the glass, as it is being formed, be cooled from the liquidus temperature to a considerably lower temperature in a relatively short period of time.

Thus the invention, as hereinafter described, has its greatest utility in the formation of continuous sheets, rods or bars of glass from materials that are susceptible to devitrification and permit the drawing of such materials at temperatures above the liquidus.

Figure 1:
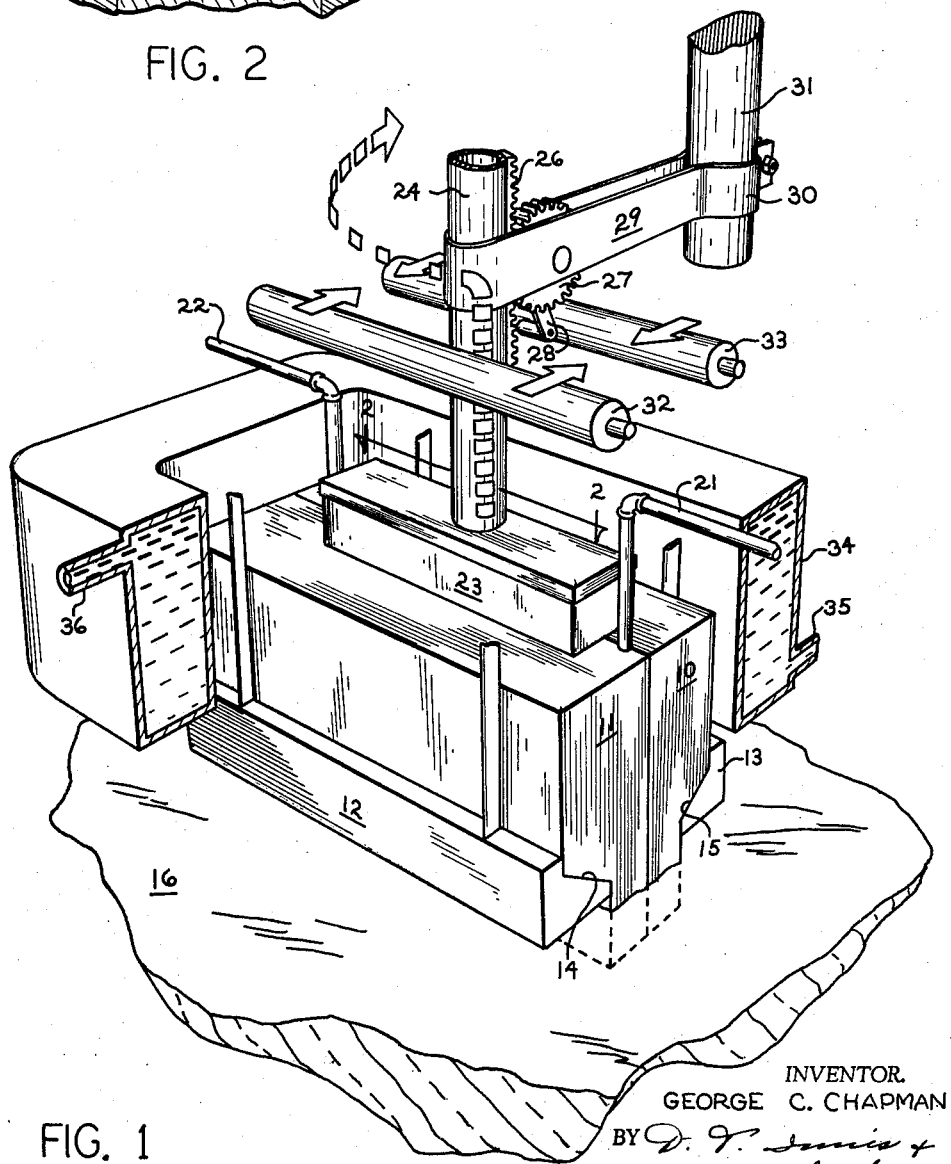
FIG. 1 is a schematic perspective view of the apparatus of the invention.

With reference to the drawings, the apparatus of the invention comprises a carbon die formed of two parts 10 and 11 supported by a pair of side members 12 and 13 which have downwardly and inwardly tapered faces 14 and 15 which are adapted to underlie complementary surfaces formed along the outer surface of the die halves 10 and 11. The particular die structure shown is utilized in forming glass sheets. Thus, the die halves 10 and 11 are relatively long in relation to their width. When the two dies are positioned in face-to-face relationship, as illustrated in FIG. 1, they form a vertical passage therethrough of precise dimensions. With the die positioned in its operative relationship with respect to the molten glass, designated 16, the lower end of the die halves 10 and 11 are submerged beneath the surface of the molten glass.

Figure 3:
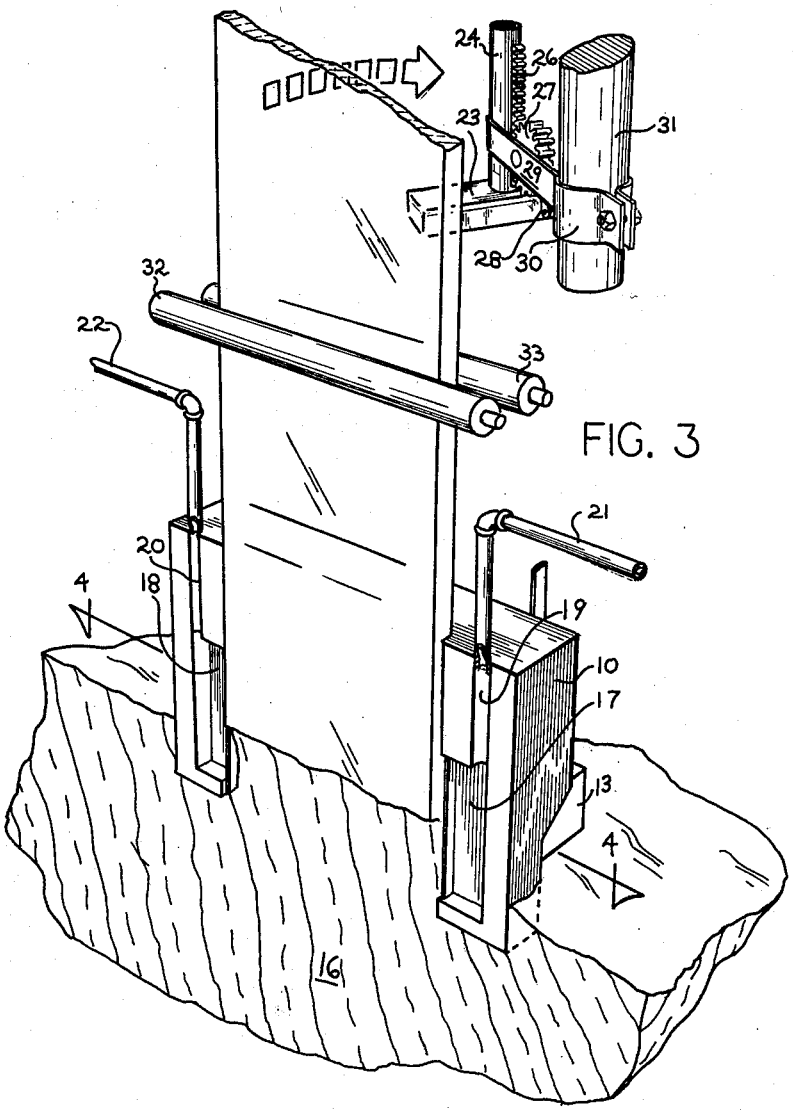
FIG. 3 is a perspective view, similar to FIG. 1, of one-half of the die apparatus of the invention.
Figure 4:
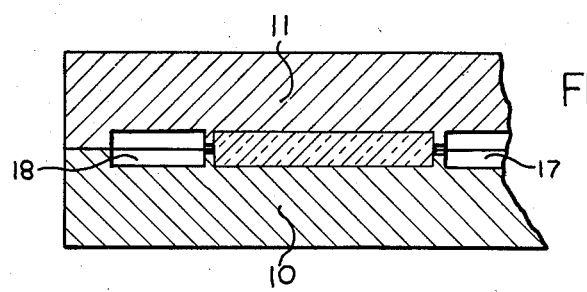
FIG. 4 is a cross-sectional view taken at line 4—4 of FIG. 3 with both halves of the die shown in assembled position.

As best illustrated in FIG. 3, the face of the die half 10 has cut-out portions 17 and 18 which define a recess of approximately .012 inch in depth. Halves of passageways 19 and 20 are cut into the face of the die half 10 and when the two die halves 10 and 11, it being understood that the other die half 11 has similar cut-out portions and passageway halves formed in its face, are assembled they will form chambers connected to passages which open through the top surface of the die halves. A pair of pipes 21 and 22 are fixed in sealing relationship with respect to the passageways 19 and 20 and are connected at their other ends to a suitable source of vacuum. The cut-out or recessed portions 17 and 18 do not open into the vertical flow path or seat throughout its total height. Along the parting line of the two die halves 10 and 11, and co-extensive with the height of the cut-out portions 17 and 18, the face or sides of the die halves are recessed approximately .001 inch. Thus, when the two die halves are sealed or locked together, a slit of .002 inch in width extends from the bottom of the die to the top of the cut-out portions 17 and 18 and provides communication between the die opening and the vacuum chambers.

With this specific construction, and with vacuum being applied through the pipes 21 and 22, molten glass will be forced by atmospheric pressure into and upward within the vertical opening defined by the two die halves 10 and 11. The .002 inch slit is sufficient to permit vacuum to hold the glass in the carbon die, but prevents molten glass from flowing into the vacuum chambers defined by the cut-out portions 17 and 18.

A vacuum manifold 23 having an internal chamber of a complementary length and width with respect to the opening formed by the two die halves 10 and 11, is adapted to be precisely positioned over the open upper end of the vertical opening formed by the two die halves. A pipe 24 is connected to the closed top of the manifold 23 and serves as both a support for the vacuum manifold and the means for applying a vacuum to the interior of the manifold. The manifold also has a perforate plate 25 fixed therein which is slightly spaced beneath the top of the manifold. This perforate plate provides a simple expedient for insuring that the vacuum applied through the pipe 25 will be distributed somewhat equally throughout the entire inside of the manifold 23. Thus it can be seen that the manifold 23 serves, to a great extent, as a starting bait. The pipe 24 has a rack 26 fixed to the side thereof which extends throughout a substantial portion of the length of the pipe 24 and, in cooperation with a pinion 27 and crank 28, provides means for raising and lowering the manifold 23. The pinion 27 is pivotally mounted between a U-shaped supporting strap 29. This strap, at the closed end of the "U" extends around the pipe 24. The ends of the strap 29 are formed into a gripping bracket portion 30 which embraces the supporting rod 31. Suitable means are provided for tightening the strap 29 about the supporting rod 31.

In practice, the strap 29 is clamped to the supporting rod 31 and the vertical manipulation of the manifold is accomplished through the previously described rack and pinion arrangement, with the vertical movement of the manifold 23 being sufficient to raise the glass to a height such that it may be gripped by a pair of rollers 32 and 33. These rollers are adapted to be moved toward and away from each other into gripping relationship with respect to the solid glass which is lifted into position by the manifold 23. After the manifold has been lifted and the two rollers moved into gripping relationship with respect to the hard glass, the vacuum will be cut off within the manifold 23 and the manifold raised an amount sufficient to clear the top of glass. It being understood that the glass that would normally be within the manifold is thus released and then the manifold is swung clockwise to the position shown in FIG. 3.

At this time the rollers 32 and 33 may be driven to draw the glass vertically upward and precision formed glass will be produced on a continuous basis. If at any time it is necessary to stop the drawing of glass through the die, the vacuum which is maintained within the chambers or cut-out portions 17 and 18 will maintain the glass within the die and prevent the glass from flowing back into the main body of the molten glass.

To insure that the glass as it issues from the die is substantially in a self-supporting, solid state, a water chamber 34 is mounted in surrounding relationship with respect to a portion of the die which extends above the glass level. The water chamber 34 has an inlet 35 and an outlet 36 so that a regulated amount of cooling water may be passed through the water chamber. Obviously, the water chamber or cooling arrangement, as shown in FIG. 1, may take varying forms other than that specifically shown. In essence, the water chamber forms a means surrounding the die halves 10 and 11 to effectively cause solidification of the molten glass before the glass issues from the upper end of the die. As previously stated, the glass shaping and forming opening through the die is precisely made so that the glass, as it issues therefrom, will be of a precise known dimension.

A most satisfactory material from which the die may be formed is carbon. Carbon, being self-lubricating, will permit movement of the glass therethrough without substantial resistance to flow and is of sufficient hardness so that it will not be attacked by the high temperature glass within which the lower end thereof is submerged. In view of the fact that carbon in an oxidizing atmosphere at elevated temperatures, will have a tendency to deteriorate, applicant provides a coating of platinum over the external surface of at least that portion of the carbon die that is exposed to air at elevated temperatures.

The invention lends itself particularly well to the formation of sheets, rods or bars which must be precision formed and finds particular use when used to form members from materials which are susceptible to devitrification and permits the continuous drawing of such devitrifiable materials at temperatures above the liquidus. It is readily appreciated that the devitrifiable glasses, if they are to be prevented from devitrifying during the formation of articles therefrom, must be quickly cooled from a temperature above their liquidus to a temperature somewhat below the liquidus, which lower temperature is that at which substantial devitrification will not occur.

Other and further modifications may be resorted to within the spirit and scope of the appended claims.

I claim:
1. Apparatus for precision forming of glass members comprising a carbon die having a vertical, glass shape defining opening formed therethrough, plural chambers formed in said die extending throughout a substantial portion of its height but completely enclosed in said die, a vertical slit connecting each chamber with the shape defining opening in the die, means connected to said chambers for applying a vacuum thereto, means surrounding said die for cooling the glass in the upper portion of said die to a solid state, and means positioned above said die for engaging and drawing the solid glass from said die.

2. Apparatus for precision forming of glass members comprising a solid carbon die having a vertical, glass shape defining opening formed therethrough, plural chambers formed in said die extending throughout a substantial portion of its height but completely enclosed in said die, a vertical slit connecting each chamber with the shape defining opening in the die, means connected to said chambers for applying a vacuum thereto, an open bottom vacuum manifold, means for supporting said manifold in overlying relationship with respect to the top of said die opening, means connected to said manifold for raising said manifold vertically upward and swinging said manifold horizontally out of alignment with said die, means surrounding said die for cooling the glass in the upper portion of said die to a solid state, and means positioned above said die for engaging and drawing the solid glass from said die.

3. The apparatus as defined in claim 2, wherein said carbon die comprises a pair of die halves that are held together with said vertical slit extending to the bottom surface of said die and means for supporting said die within and partially submerged in a bath of molten glass.

4. Apparatus for precision forming of glass members comprising a pair of carbon die halves, each die half having a vertical slot formed in one side thereof, a pair of vertically extending cut-out portions formed in said one side of each die half extending throughout a substantial portion of the die height at opposite sides of said slot, said one side of each die half having a slightly relieved portion connecting each cut-out portion with the slot in the die, means for holding said die halves in contact with each other to form a complete die, means connected to said cut-out portions for applying a vacuum thereto, an open bottom vacuum manifold, means for supporting said manifold in overlying relationship with respect to the top of said die in registry with the upper end of said slot, means connected to said manifold for raising said manifold vertically upward and swinging said manifold horizontally out of alignment with said die, means surrounding said die for cooling the glass in the upper portion of said die to a solid state, and means positioned above said die for engaging and drawing the solid glass from said die.

References Cited by the Examiner
UNITED STATES PATENTS

| | | | |
|---|---|---|---|
| 885,896 | 4/08 | Walter | 65—91 |
| 1,428,533 | 9/22 | Crowley | 65—83 |
| 1,684,456 | 9/28 | Reece | 65—99 |
| 1,726,114 | 8/29 | Morton | 65—95 |
| 1,777,584 | 10/30 | Spinasse | 65—344 |
| 2,790,994 | 5/57 | Cardot et al. | 65—187 |

DONALL H. SYLVESTER, *Primary Examiner.*